Dec. 9, 1941.  W. R. GODSEY  2,265,835
INTERMITTER VALVE
Filed April 15, 1940   2 Sheets-Sheet 1

WILBUR R. GODSEY
INVENTOR.
BY
ATTORNEYS

Dec. 9, 1941.  W. R. GODSEY  2,265,835
INTERMITTER VALVE
Filed April 15, 1940  2 Sheets-Sheet 2
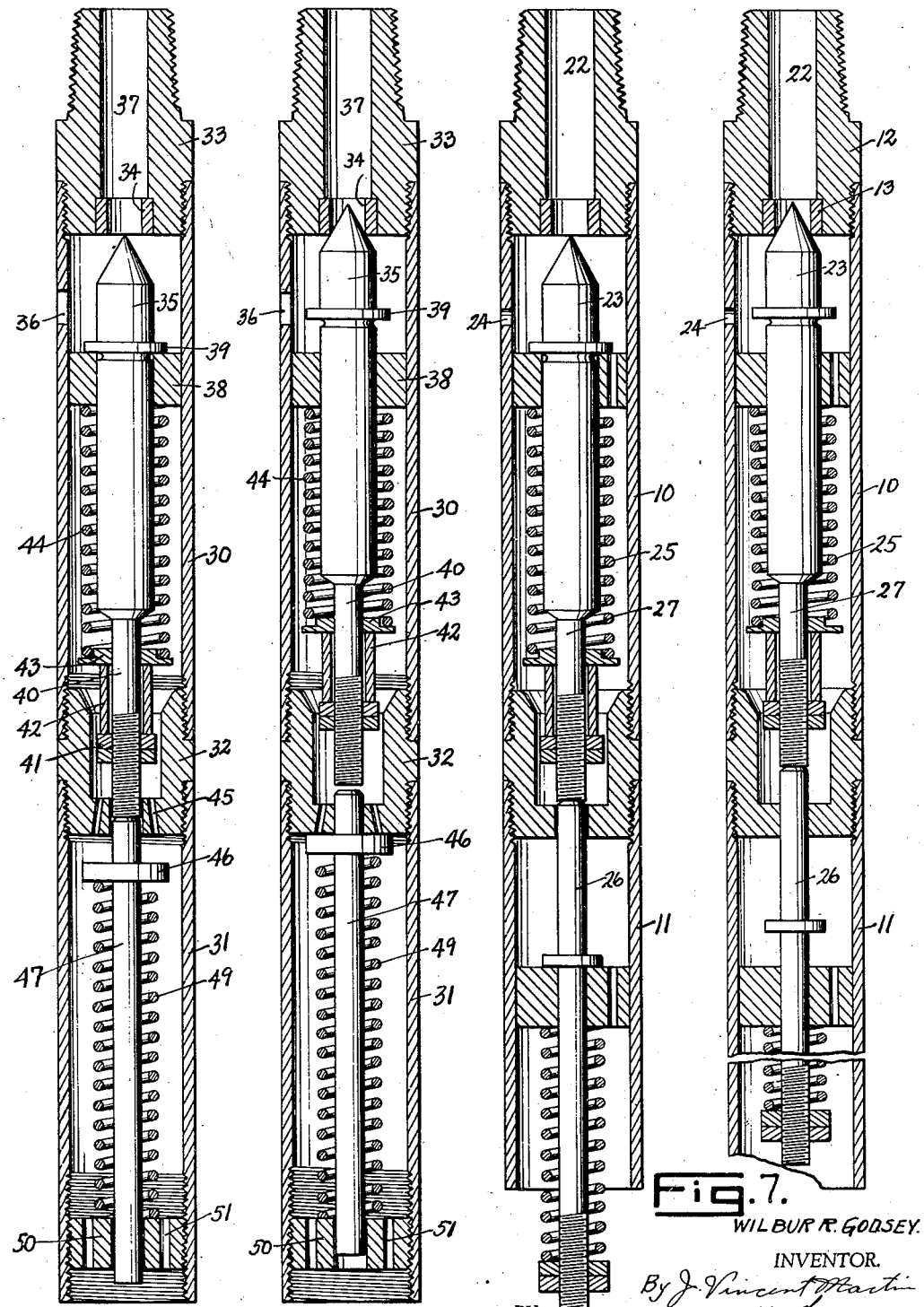
WILBUR R. GODSEY.
INVENTOR.
BY J. Vincent Martin
and Ralph R. Browning
ATTORNEYS

Patented Dec. 9, 1941

2,265,835

UNITED STATES PATENT OFFICE 2,265,835

INTERMITTER VALVE

Wilbur R. Godsey, Kilgore, Tex., assignor to Oil Lift Supply Company, Kilgore, Tex., a corporation of Texas Application April 15, 1940, Serial No. 329,692

6 Claims. (Cl. 103—233)

This invention relates to apparatus, and particularly to an intermitter valve, used in gas lift systems for flowing wells, and has for its principal object to provide an improved valve for causing a flow from the well in cases where the formation pressure is not high enough to discharge liquid above ground.

In my pending application Serial Number 329,693, filed April 15, 1940, there is disclosed valves of the unloading or flow type. Such valves and assembly are used when there is a fair bottom hole pressure and a well capable of a substantial amount of production.

The present invention is intended for use where the bottom hole pressure is very low, although it might be used in other instances where other conditions make it desirable to use a device of this type.

In an installation using the intermitter valve of this invention the apparatus may include a series of upper valves of the unloading or flow type disclosed in said pending application. Only the lowermost valve would be of the intermitter type to which the present invention relates.

The upper valves operate in the same manner as in said pending application to unload the well, but the lowermost or intermitter valve has a different operation. Thus instead of having a small gas capacity the intermitter valve has a much larger gas capacity than the flow valves. When the intermitter valve is open it admits so much gas in such a short space of time that it does not merely aerate the column of liquid but forms a large gas piston or slug beneath the column of liquid which is in the tubing above the intermitter valve. This gas piston at first forces the column of liquid upwardly as the gas is admitted to the tubing and the piston of gas becomes larger by virtue of more gas being admitted. Then, this intermitter valve closes to shut off the supply of gas to the tubing and the gas which has been admitted to the tubing expands and in so expanding acts to raise the column of liquid in the tubing to the surface of the ground.

The distinction between a flow valve of the type disclosed in said pending application and an intermitter valve of the type to which the present invention relates is that the flow valve admits relatively small quantities of gas over a relatively long period of time to form small bubbles in the column of oil and thus lighten the column and make it possible for the well pressure to lift the column, whereas the present intermitter valve admits a large quantity of gas in a relatively short period of time and then closes so that this gas may expand and act as a piston to force the column of oil above the valve out of the well. The present invention does this automatically without manual operation or control.

Ordinarily the intermitter valve is employed above a packer to avoid placing the pressure of the gas on the formation. When the formation pressure is so low that it will not raise the oil a substantial distance a modified form of valve mounting permits placing the valve in a chamber below a packer, the accumulation of liquid within the chamber, and the admission of gas to the chamber to force the liquid in the chamber out through the well tubing.

The invention is illustrated in the accompanying drawings in which:

Fig. 4 is a longitudinal section through an intermitter valve constructed in accordance with this invention.

Fig. 5 is a similar view of the same valve showing the same in closed position.

Fig. 6 is a similar view of a flow valve such as used in connection with this invention, the same being shown in open position.

Fig. 7 is a similar view of the flow valve showing it in a closed position.

Referring particularly to the drawings, 6 indicates a well casing and 7 the sectional well tubing therein. These are provided at the top with suitable Christmas tree connections indicated at 8 to admit gas pressure into the casing and permit flow of oil or other liquid from the tubing. The tubing may be provided with a packer 9 to close off the casing from the formation at a low point in the well.

Figures 1, 2, 3:
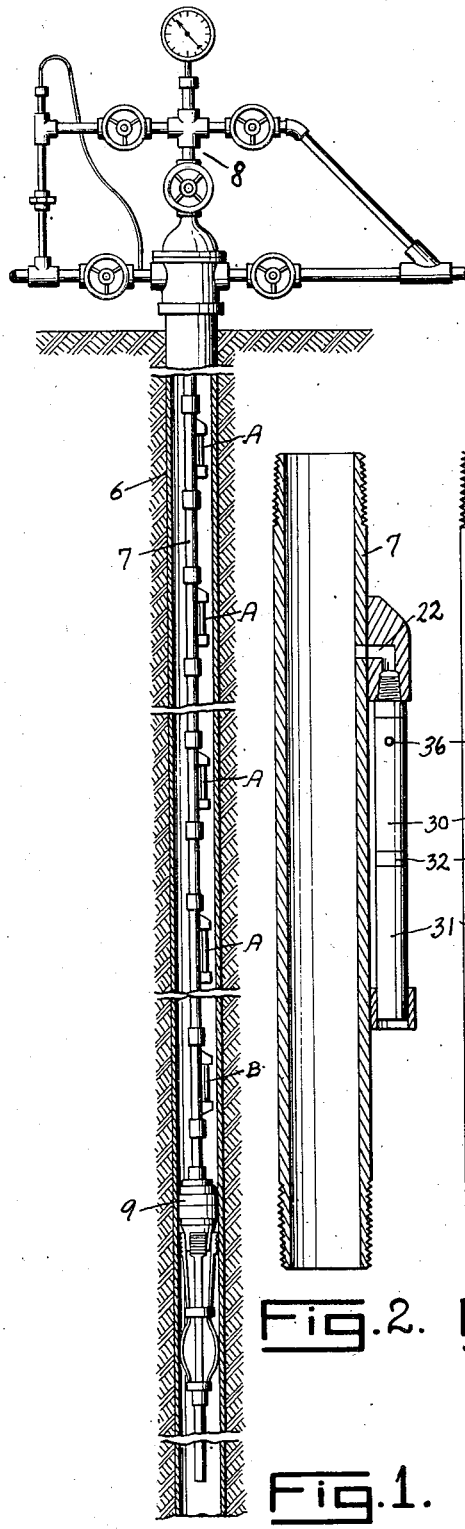
Fig. 1 is a longitudinal section through the casing of a well having a tubing and valves positioned therein in accordance with this invention.
Fig. 2 is a longitudinal section through a section of tubing illustrating the manner of mounting the valves on the tubing.
Fig. 3 is a side elevation of the structure shown in Fig. 2.

In Fig. 1 the tubing is shown provided with a series of valves A at different levels. They are the unloading or flow valves disclosed in our said pending application. Below these valves, and preferably a short distance above the packer, the tubing is provided with an intermitter valve B. The valves A are shown in detail in Figs. 6 and 7. The valve B, or intermitter valve, is shown in detail in Figs. 4 and 5.

The valves A are particularly described in said pending application. Briefly, they comprise a tubular valve casing consisting of upper and lower sections 10 and 11, the former of which is connected at the upper end to a fitting 12 having a valve seat 13 and communicating through a passage 22 with the interior of the tubing 7 and containing a reciprocating valve 23 which controls the passage of gas from the inlet 24 into the tubing. The valve 23 is normally held open by a coiled spring 25, but may be closed by a plunger 26 upon the establishment of considerable differential pressure between the pressure in the casing and the pressure in the tubing, the upper end of the plunger 26 operating against the lower end of the valve stem 27, as more fully appears from said pending application.

The intermitter valve B is as stated placed low down in the well, below the valves A, and is somewhat similar in general structure and mode of attachment to the valves A. Said valve B is shown in detail in Figs. 4 and 5. It comprises a cylindrical structure consisting of an upper section 30 and a lower section 31 connected by a screw coupling 32 and having at the top a fitting 33 containing a valve seat 34 cooperating with the reciprocating valve member 35 which controls the flow of gas from an enlarged inlet port 36 in the wall of the section 30 to the passage 37 leading to the well tubing. The valve 35 works through a fixed guide 38 and has a stop collar 39 which stops against the guide ring 38 to limit the opening movement of the valve. The valve terminates at its lower end in a reduced stem 40 threaded to receive nuts 41 and a ferrule 42 which supports the washer 43 between which and the guide 38 a coiled spring 44 is held in compression and tends to hold the valve in open position.

The coupling 32 has ports 45 opening through the bottom thereof and adapted to be closed by a stop collar 46 on a plunger rod 47 the upper end of which works against the lower end of the stem 40 in a guide hole formed in the bottom of the coupling 32. A spring 49 is coiled around the plunger 47 in compression between the collar 46 and a guide plug 50 screwed into the lower end of the cylinder section 31. The plug 50 has through ports 51 and may be screwed in or out to vary the compression of the spring 49. It will be noted that the spring 49 tends to lift the plunger and thereby tends to lift the valve 35 toward closing position, against the pressure of the spring 44 tending to open it.

Figures 8, 9:
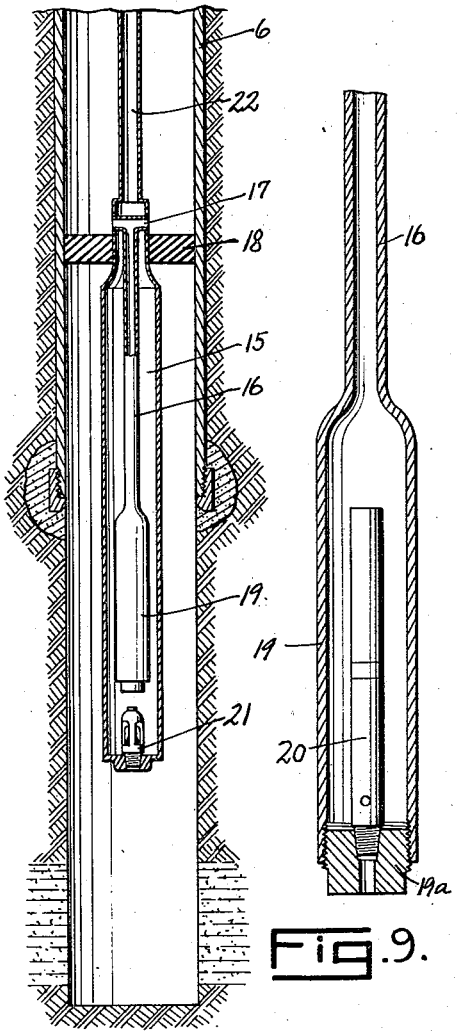
Fig. 8 is a longitudinal section through the lower end of a well illustrating a modified mounting for the intermitter valve.
Fig. 9 is a longitudinal section through the valve chamber of the arrangement shown in Fig. 8.

In Figs. 8 and 9 there is shown a modification whereby the intermitter may be placed a considerable distance below the packer 18, without placing the pressure of the gas on the formation. This is particularly useful in cases where the formation pressure is so low that it will not raise the oil a substantial distance. This form permits the accumulation within a tubular chamber 15 of a substantial amount of oil at a relatively low level. Within the chamber 15 there is a small tubing 16 extending downwardly from opening 17 to the casing pressure above the packer indicated at 18. At its lower end the tubing 16 is enlarged to form a chamber 19 having an intermitter valve 20 mounted therein by screwing in inverted position into the bore of a plug 19a at the bottom of the chamber 19. The chamber 15 has an upwardly opening check valve 21 at its lower end. Oil will rise through this check valve, and when the intermitter valve 20 opens gas will flow in through the opening 17 and the tubing 16 and out through the intermitter valve 20 into the lower end of chamber 15 and force the liquid in said chamber up through the tubing 22 which is connected to or forms a part of the well tubing 7.

With respect to the operation and function of the intermitter valve it may be prefaced that the ideal intermitter valve is a valve which can be set to open and admit gas into the tubing when the fluid height in the tubing is relatively very small. This valve should have a large capacity so that it will admit a large volume of gas at relatively high pressures in a very short time. This would raise the pressure in the tubing at the valve very rapidly, whereupon the gas so admitted would begin expanding to move the slug of liquid in the tubing above the valve upwardly. As this expansion occurs the pressure within the tubing at the valve should begin to drop. The ideal intermitter valve at this point would close so as to permit the gas to expand and drive the liquid out through the tubing without the admission of any more gas into the tubing.

In order to accomplish the foregoing it would be necessary that a valve be set to open while there still exists a very large differential between the pressure in the tubing and that in the casing. It should however be set to close when the differential between the tubing and casing is much lower than that at which it opened. Naturally if a valve is set to open at a given differential, it could not ordinarily be made to stay closed when the differential is less.

With the present intermitter valve tests show that the above stated desired results have in substance been obtained. While we cannot be certain of the exact reasons why the valve operates as it does because of the large number of variable factors effecting its operation, it appears that the operation is as follows:

Let it be assumed first that the tubing has been emptied down to the level of the intermitter valve B and that the casing has been blown free of oil. The pressure in the tubing will be substantially zero whereas that in the casing will be whatever pressure is being used on that particular well. The differential between the casing and the tubing will then be substantially the casing pressure and this pressure will be acting upon the valve element to hold it closed. The force holding the valve element closed would be opposed in part by the spring 44 surrounding the valve element 35. The spring 49 surrounding the auxiliary plunger 47 will not be exerting any force on the valve element at this time because that auxiliary plunger is provided with a stop 46 that keeps it from contacting the valve stem 40 when the valve element is in fully closed position. In fact, the valve element can move to some predetermined distance (1/64 to 3/64" in practice) before it contacts the plunger 47.

The liquid in the well will now begin to rise in the tubing 7 and as it rises the pressure then in the tube at the intermitter valve will increase. As this pressure increases it will exert a force on the valve element tending to open it. When the force exerted by this pressure plus the force exerted by the spring 44 which surrounds the valve element equals the force exerted by the casing pressure on the valve element and slightly exceeds the same, the valve element 35 will start to move toward open position. As it opens slightly, the pressure within the tubing will begin to increase due to the entry of high pressure gas and the valve element will have a greater force acting on it tending to open it. This increasing force on the valve element will cause it to snap quickly to full open position and in so doing to strike the auxiliary plunger 47 and compress the spring 49 which surrounds the auxiliary plunger. Because the auxiliary plunger 47 is not in contact with the valve element when the valve is closed, the valve may begin to open at a pressure differential which is controlled entirely by the adjustment of spring 44 and not affected by the adjustment of spring 49. The valve will then move to fully open position for the reasons stated above. This valve is provided with a relatively large intake port 36 so that it will admit gas to the tubing at a very high rate. This will rapidly increase the pressure in the tubing to a value approaching that in the casing. In fact this increase will be almost instantaneous. This increased pressure in the tubing at the valve will in a short period of time begin to overcome the inertia of the column of liquid above the valve and start it moving upwardly. As this movement increases the gas in the tubing will begin to expand and drop in pressure. As the gas begins to expand, the pressure within the valve housing 30 just inside of the intake port 36 will drop because of the throttling effect of the intake port and the differential between the pressure at this point and the pressure in the casing, which also exists in valve housing 30 below the guide ring 38, will act on the valve stem below said guide tending to close the valve. This force will be assisted by the spring 49 surrounding the auxiliary plunger and will only be opposed by the spring 44 surrounding the valve element. As soon, therefore, as the pressure in the tubing is lowered by expansion a relatively small amount, the valve element will be moved toward a closed position. The valve element at this time may or may not completely seat itself in closed position. If it does seat itself it may again be opened immediately due to the relatively low differential between the pressure in the tubing and that in the casing. However, it will at least be moved close to its seat and if it does not close off entirely it will cause a throttling effect which will retard the flow of gas to the tubing. Due to this retardation of the flow into the tubing and the expansion of gas in the tubing, the pressure in the tubing will drop rather rapidly until the point is reached where the differential between the tubing and casing pressure is great enough to keep the valve closed. During this expansion the liquid in the tubing will be forced upwardly and this upward travel will be continued due to the work done in expanding the gas.

The valve will now remain closed until the liquid level can rise in the tubing a sufficient amount to decrease the differential between tubing and casing enough to open the valve.

As above stated, when the valve first opens even slightly the pressure in the tubing at the valve will rise very rapidly because the inertia of the liquid column in the tubing will delay its upward movement and prevent immediate expansion of gas entering the tubing. This rise will be so great and rapid that the spring 49 will be overcome when the valve opens sufficiently to contact the plunger 47. For this reason, although the differential which initiates and hence controls the opening of the valve is unaffected by the spring 49 and plunger 47, the valve will when open be acted upon by the spring 49 and plunger 47 to determine its closing differential.

Once the opening differential has been determined by adjustment of spring 44, the closing differential may be adjusted, without disturbing the opening differential, by adjustment of spring 49. When the valve is closing this spring and the plunger 47 will act on the valve until it is almost closed. Flow through the valve at this time will be very rapid without raising the pressure therein because there will either be no liquid in the tubing or if any is present it will be moving rapidly upwardly. When the valve has almost closed therefore there will be a substantial throttling effect, resulting in a sharp drop in pressure across the valve and this will ever increase, as the gas in the tubing expands, until it forces the valve shut.

I claim:

1. A valve for intermittently admitting gas under pressure to an upright liquid conduit comprising a member having a passageway for the passage of such gas into said conduit, a valve element movable to close and open said passageway, resilient means for urging said valve element to open position, resilient means for urging said valve element when open to closed position, and means for rendering said last mentioned means inoperative to act on said valve element when said valve element is in fully closed position.

2. A valve for intermittently admitting gas under pressure to an upright liquid conduit comprising a member having a passageway for the passage of such gas into said conduit, a valve element movable to close and open said passageway, resilient means for urging said valve element to open position, resilient means for urging said valve element when open to closed position, means for rendering said last means inoperative to act on said valve element when the valve element is in fully closed position, said valve being subject to the pressure within said conduit tending to open the valve and to the pressure of the gas to be injected into said conduit tending to close the valve.

3. In a gas lift apparatus for wells, the combination with the well casing and the tubing within the same, of an intermitter valve controlling flow of gas under pressure from the casing into the tubing, said valve comprising a valve casing having a valve port, a valve element in this casing for controlling flow through said port, a plunger in the valve casing, disconnectedly acting against the valve element and tending to close the same, and a spring connected to the valve element and tending to open the same, the valve element being automatically actuated by differential pressures in the well casing and tubing to intermittently open and close.

4. The combination stated in claim 3, the valve port when open being sufficiently large to pass enough gas to form a gas piston within the tubing when the valve is open.

5. In a gas lift apparatus for wells, the combination with a well casing and tubing within the same, of means to intermittently admit gas pistons from the casing into the tubing, comprising a cylindrical valve housing opening into the tubing and having a relatively large inlet port, a reciprocating valve member in the housing controlling the flow from said inlet port to the tubing, a spring coiled around said member and tending to open the same; a plunger in the housing, disconnectedly bearing against said valve member to move the same toward closing position, and a spring bearing against the plunger and tending to assist said closing action.

6. The combination stated in claim 5, the plunger having a stop which limits its closing action against the valve member short of complete closure of the valve member.

WILBUR R. GODSEY.